United States Patent
Rosales et al.

(10) Patent No.: US 12,460,933 B2
(45) Date of Patent: Nov. 4, 2025

(54) MULTIMODAL MOBILITY SERVICES WITH MINIMIZED PERCEIVED RISKS

(71) Applicant: Intel Corporation, Santa Clara, CA (US)

(72) Inventors: Rafael Rosales, Unterhaching (DE); Yang Peng, Munich (DE)

(73) Assignee: Intel Corporation, Santa Clara, CA (US)

( * ) Notice: Subject to any disclaimer, the term of this patent is extended or adjusted under 35 U.S.C. 154(b) by 886 days.

(21) Appl. No.: 17/131,665

(22) Filed: Dec. 22, 2020

(65) Prior Publication Data

US 2021/0108933 A1    Apr. 15, 2021

(51) Int. Cl.
*G01C 21/34*    (2006.01)
*G01C 21/36*    (2006.01)
*G06N 5/04*    (2023.01)

(52) U.S. Cl.
CPC ..... *G01C 21/3423* (2013.01); *G01C 21/3461* (2013.01); *G01C 21/3484* (2013.01); *G01C 21/3617* (2013.01); *G01C 21/3691* (2013.01); *G06N 5/04* (2013.01)

(58) Field of Classification Search
CPC .......... G01C 21/3423; G01C 21/3461; G01C 21/3484; G01C 21/3617; G01C 21/3691; G06N 5/04; G06N 5/01; G06Q 10/047; G06Q 10/0635; G06Q 50/40
See application file for complete search history.

(56) References Cited

U.S. PATENT DOCUMENTS

| | | | |
|---|---|---|---|
| 10,962,372 B1 * | 3/2021 | Rao | G01C 21/3484 |
| 2009/0119001 A1 | 5/2009 | Moussaeiff et al. | |
| 2010/0280748 A1 * | 11/2010 | Mundinger | G01C 21/3423 |
| | | | 701/532 |
| 2017/0328725 A1 * | 11/2017 | Schlesinger | G01C 21/3438 |
| 2022/0034673 A1 * | 2/2022 | Grimm | G06N 20/00 |
| 2022/0187085 A1 * | 6/2022 | Luciani | G01C 21/3415 |

FOREIGN PATENT DOCUMENTS

| | | |
|---|---|---|
| CN | 1920485 | 2/2007 |
| CN | 103158717 | 8/2017 |
| KR | 20060085368 | 7/2006 |
| KR | 20080041761 | 5/2008 |

(Continued)

OTHER PUBLICATIONS

"Citymapper", https: citymapper.com dallas, 6 pgs.

(Continued)

*Primary Examiner* — Anne Marie Antonucci
*Assistant Examiner* — Jewel Ashley Kuntz
(74) *Attorney, Agent, or Firm* — Schwegman Lundberg & Woessner, P.A.

(57) ABSTRACT

Disclosed herein are systems and methods for dynamically minimizing a perceived risk for a multimodal mobility service. The systems and methods may include identifying a safety-related attribute for a route from a starting location to an ending location. The safety-related attribute may be associated with a perceived risk for a dimension of the route. A risk score for the route may be determined using the safety-related attribute. The risk score for the multimodal mobility service based on the perceived risk for the dimension of the route.

23 Claims, 7 Drawing Sheets

(56) References Cited

FOREIGN PATENT DOCUMENTS

TW       I579528      4/2017
WO       2022139898   6/2022

OTHER PUBLICATIONS

"Fitbit sense smart watch", https: web.archive.org web 20201104032213 https: www.fitbit.com global us products smartwatches sense, (Nov. 4, 2020), 8 pgs.

"Electrodermal Activity (EDA)", https: link.springer.com referenceworkentry 10.1007%2F978-1-4419-1005-9_13, (2013), 6 pgs.

Hewitt, Charlie, "Assessing public perception of self-driving cars: the autonomous vehicle acceptance model", IUI 19, Mar. 17-20, 2019, Marina del Ray, CA, USA, (2019), 12 pgs.

Wang, L, "Temporal Segment Networks for Action Recognition in Videos", IEEE Transactions on Pattern Analysis and Machine Intelligence, (May 8, 2017), 14 pgs.

"Taiwanese Application Serial No. 110132877, Office Action mailed Sep. 15, 2022", w English Translation, 16 pgs.

"Taiwanese Application Serial No. 110132877, Response filed Nov. 24, 2022 to Office Action mailed Sep. 15, 2022", w English claims, 52 pgs.

"International Application Serial No. PCT US2021 049903, International Search Report mailed Jan. 3, 2022", 3 pgs.

"International Application Serial No. PCT US2021 049903, Written Opinion mailed Jan. 3, 2022", 6 pgs.

\* cited by examiner

MULTIMODAL MOBILITY SERVICES WITH MINIMIZED PERCEIVED RISKS

FIELD OF THE DISCLOSURE

The present subject matter relates to infrastructure and autonomous vehicles. Specifically, the present disclosure relates to dynamically adjusting infrastructure used by autonomous vehicles.

BACKGROUND

Autonomous vehicles are currently in different stages of development. Depending on the level of automation, the vehicles may be capable of travel without any interaction from a driver, a level 5 completely autonomous vehicle, to no automation at all, a level 0 non-autonomous vehicle. As with any new technology, there may be some fear associated with autonomous vehicles. Some people are afraid to fly, even though statistically, flying is safer than driving.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

People may have a risk expectation with the use of autonomous vehicles. One problem that may be associated with autonomous vehicles is to satisfy the tolerable risk expectations of the public. Each person may have a different threshold of an acceptable driving risk. As disclosed herein, using perceived risks associated with autonomous vehicles and other modal transportation services, the perceived risk of user can be minimized.

For example, some people may be afraid to drive on a highway due to high speed and may be even more afraid of riding in an autonomous vehicle at high speeds on a highway where a person is not in control of the vehicle. As another example, some people perceive left turns as having a high risk and thus, do not make left turns while driving. Many people may prefer to avoid closed spaces with other people, such as on a bus or train. By understanding the individual risk perception of users of transportation systems, the systems and methods disclosed herein may allow for an enhanced multimodal mobility experience by reducing the perceived risks and increasing the acceptance of autonomous alternatives.

The systems and methods disclosed herein allow for the perceived risks of users to be inferred based on trip selection and user reactions during trips that utilize multimodal transportation systems. The perceived risk may be applied to optimize trip planning by minimizing the total risk score of possible alternatives. The results may be shown to the user to increase the trust in autonomous vehicle modalities taking into account the user's risk perception.

The systems and methods disclosed herein provide improvements to current single modality mobility planning platforms in various ways. One example is that users may specify preferences about driving and road conditions the users wish to avoid because they are viewed as having a high risk for accidents. This may be achieved by explicitly considering the user's perception of risk as part of the optimization objectives.

The systems and methods disclosed herein consider multimodal transportation, which may have different degrees of automation. As disclosed herein, different degrees of automation may range from a modality with no automation to a modality that is fully autonomous and completely automated. For instance, a level 0 (L0) modality, as defined by the Society of Automotive Engineers, may be a modality with no automation. Examples of modalities with no automation may include a bicycle, walking, and/or a vehicle or other transportation system that is operated by a person without assistance from onboard systems. A level 5 (L5) modality, as defined by the Society of Automotive Engineers, may a modality that is controlled completely by onboard systems. Examples of fully autonomous modalities include trains, buses, robotaxis, etc. that are controlled solely by onboard systems without interaction from an operated on the modality. For instance, a train, bus, or automobile that operates without a driver is fully autonomous.

By characterizing perceived risks among multiple dimensions in each modality, a user's perceived risk associated with the various dimensions may be considered and used to prove multimodal mobility services that minimize anxiety due to perceived risks. For example, a user who is a regular cyclist may prefer to avoid non-reserved lanes, a user who is a vehicle driver may prefer to avoid round-abouts, other users may trust the use of automated vehicles only in specific controlled zones, etc. These considerations may be taken into account to plan multimodal mobility services using the systems and methods disclosed herein.

Examples disclosed herein describe a combination of automatic monitoring techniques to identify statistical evidence that supports the individual estimation of risk of a transportation user. This evidence may be comprised of a user's consistent choices and preferences that cannot be justified from other typical mobility objectives such as total trip time, trip length or trip cost. For example, a user may consistently choose a route that increases trip time and cost more than other routes in order to avoid a modality that the user deems to have a high risk. For example, a user may view a roundabout as dangerous due to the need for vehicles, whether autonomous or driven by a person, to self-regulate entering the roundabout. Thus, a user may choose a route, regardless of if the user is driving or is a passenger, to avoid roundabouts.

The applicability of the techniques disclosed herein may be dependent on the mobility modality. For example, for pedestrians, e-scooters, bicycles, and car-sharing drivers, the remote monitoring of their routes based on geo-localization may be used to identify idiosyncratic route choices. For automated vehicles, rules may be used to monitor users and driving information. The gathered evidence may then be interpreted to form risk scores in several dimensions. Non-limiting examples of dimensions include modalities in general, specific classes of transport segments (e.g., roundabouts, reserved lanes, etc.), specific maneuvers (e.g., avoidance of left turns), and driving parameters (e.g., speeds below 100 km/hour (approximately 65 mph). The scores may be used to compute a total risk score for each multimodal mobility alternative, sometimes referred to as a route choice, and added as an optimization objective for planning travel using a multimodal mobility service.

The systems and methods disclosed herein also increase efficiency and current systems by including the user perception of risk in the computation of trip alternatives. In addition, the system sand methods disclosed herein provide a transparent interface to inform users about the provided safety-related options, thus enhancing the trust of customers in automated mobility.

The above discussion is intended to provide an overview of subject matter of the present patent application. It is not intended to provide an exclusive or exhaustive explanation of the invention. The description below is included to provide further information about the present patent application.

Figure 1:
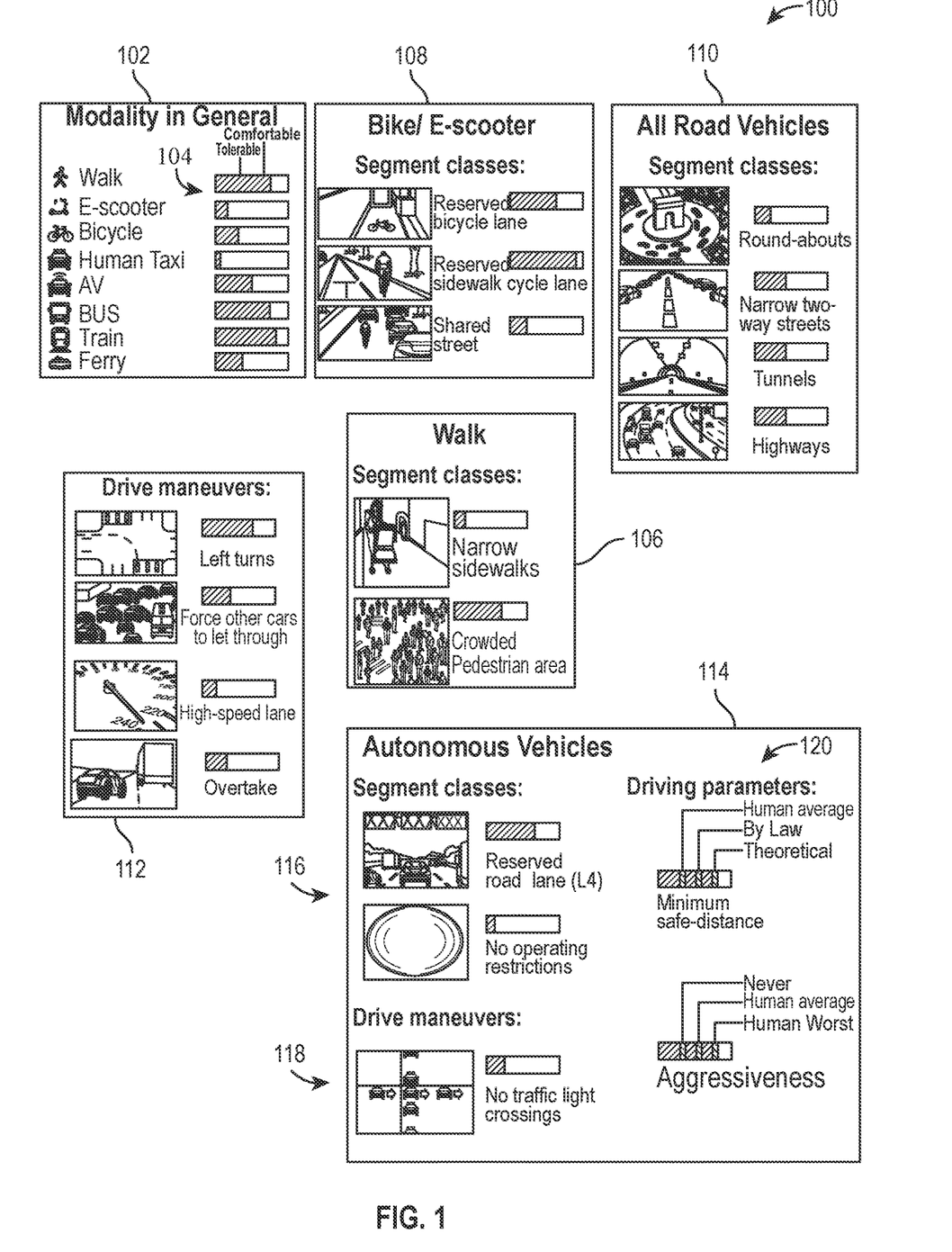
FIG. 1 illustrates examples of individual risk perception scores in accordance with at least one example of this disclosure.

Turning now to the figures, FIG. 1 shows examples of individual risk perception scores 100 in accordance with at least one example of this disclosure. As shown in FIG. 1, risks may be perceived for multiple dimensions, sometimes referred to as objectives. A first dimension 102 may be a modality in general. Non-limiting examples of a modality may include walking, e-scooters, bicycles, human driven taxis, autonomous taxis, buses, trains, and ferries. Each of the modalities may have a risk perception as indicated by graphs 104. In graphs 104 more hatching represents a greater degree of comfort with a respective modality. Stated another way, less hatching represents a higher perceived risk for a respective modality. For example, for a user with the risk profile shown by first dimension 102, the user perceives the train to be the safest modality of travel and a human-driven taxi as the least safe modality of travel.

For each of the modalities there may be a perceived risk associated with how the modality is implemented. For example, for walking 106, a user may view narrow sidewalks as more dangerous than a crowded pedestrian area. For bicycles and e-scooters 108 the user may view shared streets as less safe than reserved bicycle lanes.

Within a given modality implantation, there can be additional elements having associated perceived risks. For example, for vehicles operated on a road 110, roundabouts may be viewed by the user as less safe than highways, tunnels, and narrow, two-way streets, which ma have comparable perceived risks. Different maneuvers 112 made by a vehicle may also have perceived risks. For example, a left turn may be perceived as relatively safe compared to driving in the fast lane of a highway (e.g., the left most lane on the German Autobahn).

For autonomous vehicles 114, which may be passenger cars/trucks/SUVs, public transportation such as buses, etc., operations can be divided via segment classes 116, driving maneuvers 118, and driving parameters 120. While not described with respect to e-scooters, bicycles, etc. the various divisions for autonomous vehicles, may apply equally to other modalities, such as taxi (autonomous or otherwise), e-scooters, etc.

For segment classes 116, reserved lanes may be perceived as less risky than unrestricted roads, such as sections of the German Autobahn that do not have a speed limit. Driving maneuvers 118 can include driving through intersections that do not use traffic lights, but instead rely on drivers (or the computer of an autonomous vehicle) to properly space themselves to avoid a collision while still maintaining a smooth flow of travel.

Driving parameters 120 can be a function of how autonomous vehicles are perceived to be programmed or a perceived aggressiveness of a human driver. For example, people may view taxi drivers in New York City, New York as aggressive and thus perceive a greater risk than driving with an on-demand car service.

As disclosed herein, risks are perceived risks by a user of a modality and any maneuvers, characteristics associated with the modality. Stated another way, the risks are not the actual risks as might be found in actuarial tables or other compiled data based on actual accident data and statistics. For example, statistically an autonomous taxi may be no more dangerous and/or may actually be safer statistically than a human driven taxi, but if a first user perceives autonomous vehicles as riskier than a second user, then the autonomous taxi will have a higher risk perception score for the first user than the second user.

The risk score entered by the user and/or developed using monitored behaviors may represent a quantification of a user perceived risk and the quantification on the amount of evidence accumulated. For example, the risk score may be implemented as a tuple of two members. A belief value may be stored as a real valued variable within the [0,1] range. The belief value may represent a belief of the user's perceived risk. For example, a value of 0.8 assigned to a bicycle category may represent that a user believes a bicycle modality has a relative low estimation of risk, whereas a value of 0.1 may indicate a very high associated risk.

The second part of the tuple of two members may be an integer number indicating the number of supporting instances found of the risk belief. For example, if a user has taken 10 train rides and the associated risk with trains is 0.9, the resulting tuple for trains may be modality_train=(0.9, 10). The values of the tuple may be used to weight the evidence of risk perception as disclosed herein.

Risk dimension either entered directly by the user or developed via automated techniques may include multiple dimensions. For example, general modalities may be a general dimension and each modality may have modality-specific dimensions as disclosed herein. General modalities may broadly represent the individual trust/fear in each category. Non-limiting examples of general modalities include walking, e-scooter, bicycle, human taxi, automated (partially or fully autonomous) vehicles, buses, trains (surface or underground), ferries, airplanes etc.

Another example of a general modality may be a specific route or routes. For example, high risk to particular roads at particular times may exist due to different context variables. For example, a high visual perturbance due to the sunlight directed to the eyes at dawn may increase perceived risk. This dimension may be captured through a two-dimensional map of a region. For example, specific risk scores may be developed for specific locations at specific times. For example, travel along a road toward a rising sun may be perceived as riskier than the same road traveled at sunset.

Modality dependent dimensions may include aspects particular to a given modality. For example, a walk modality may have certain characteristics that are undesirable to a user due to a perceived risk. For instance, the user may find certain sidewalks undesirable due to an associated safety hazard. As an example, families traveling with a stroller on a narrow sidewalk may be perceived as having a higher risk than a wide sidewalk.

For people with health conditions, a crowded space, such as a pedestrian area, may be perceived as risky due to a fear of contracting a viral infection such as the flu. Persons that use wheelchairs or other walking aids may have a fear of rail crossings and thus avoid segments that require them to walk across rail crossings.

Different cities and different zones within cities may provide different lanes for modalities not motorized with varying degrees of acceptance. For example, for bike and e-scooters, some streets may explicitly allow the presence of both automobiles and bicycles/e-scooter. Thus, cyclists may perceive shared streets as having diminished safety protection mechanisms against a vehicle in case of an accident.

Some streets may explicitly separate areas where cyclists and vehicles may occupy in the same road. Some streets may provide a bike lane adjacent a road and/or on the sidewalk.

For autonomous vehicle modalities, restrictions on the operating conditions and driving policies of autonomous vehicles can provide confidence to users. For example, if the operational design domain of an automated vehicle is constrained to a certain lane, the development and verification requirements may become significantly less challenging and may provide more confidence for user adoption of people that may be skeptical of autonomous vehicles. The result may be that for segments of multimodal mobility travel on roads specifically designed with autonomous vehicles in mind may be perceived as less risky than other roads.

Roads with no operating restrictions may be perceived as riskier than roads with operating restrictions. Roads that allow fully autonomous vehicles, sometimes referred to as L5 autonomy vehicles, with certain features may generate higher perceived risks. For example, road intersection coordination, where autonomous vehicles do not stop at an intersection, but instead coordinate their movements, may make users feel uncomfortable and thus generate higher perceived risk. Other maneuvers such as left turns, forced incorporation of a vehicle into to an existing flow of traffic (e.g., a vehicle entering an interstate highway via an onramp), overtake of other vehicles, etc, performed by L5 vehicles may also generate high perceptions of risk. Specific parameters such as a safe-minimum distance (e.g., a safe longitudinal or safe lateral distance to other vehicles or objects), which humans may underestimate/ignore, but autonomous vehicles will not, may decrease a user's perception of risk.

Figure 2:
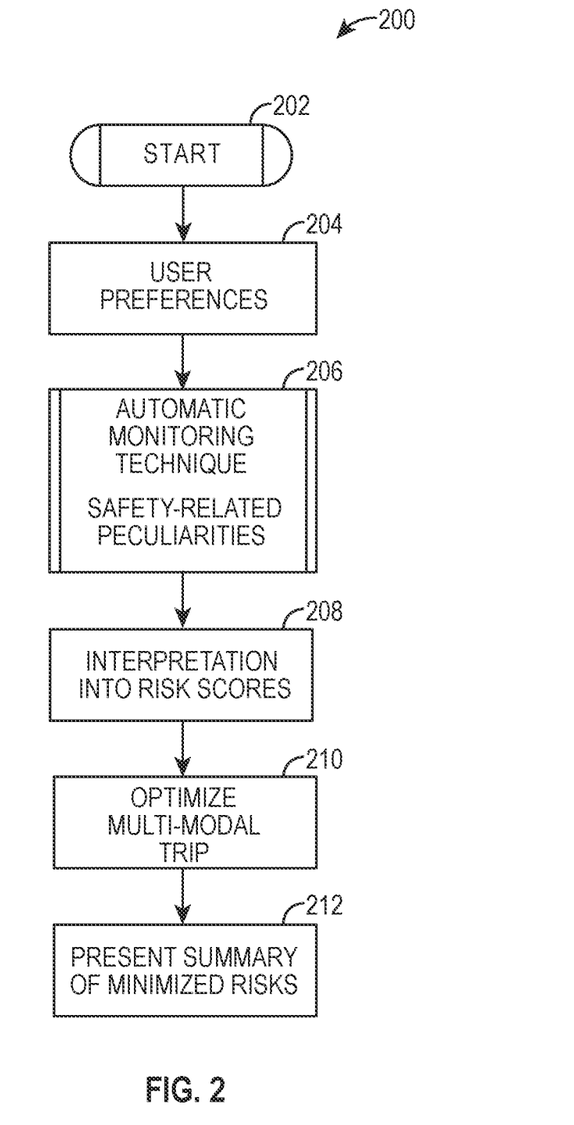
FIG. 2 illustrates an example method for minimizing a perceived risk for multimodal mobility service in accordance with at least one example of this disclosure.

FIG. 2 shows an example method 200 to identify statistical evidence of a user's perception of risk in accordance with at least one example of this disclosure. As disclosed herein, automated techniques, possibly amenably to different modalities, as well as direct user input, may be used to identify statistical evidence of the user's perception of risk. The gathered evidence may be interpreted into a set of risk scores in multiple dimensions. The scores may be used to compute a total risk metric on alternative trips proposed. Users may be provided with a summary of the risks minimized. This metric may serve as another optimization objective to enhance the trust of users in using various forms of multimodal transportation.

Method 200 may begin at starting block 202 and proceed to stage 204 where a user can input user preferences. For example, using an application on a mobile or other computing device, the user may directly input perceived risk for various modalities. For instance, a user may enter a number, such as a percentage between 0% and 100% indicating a perceived likelihood of being in an accident and/or injured using a particular modality, segment class, driving parameters, etc. This information may be saved as part of a tuple as disclosed herein.

Figure 3:
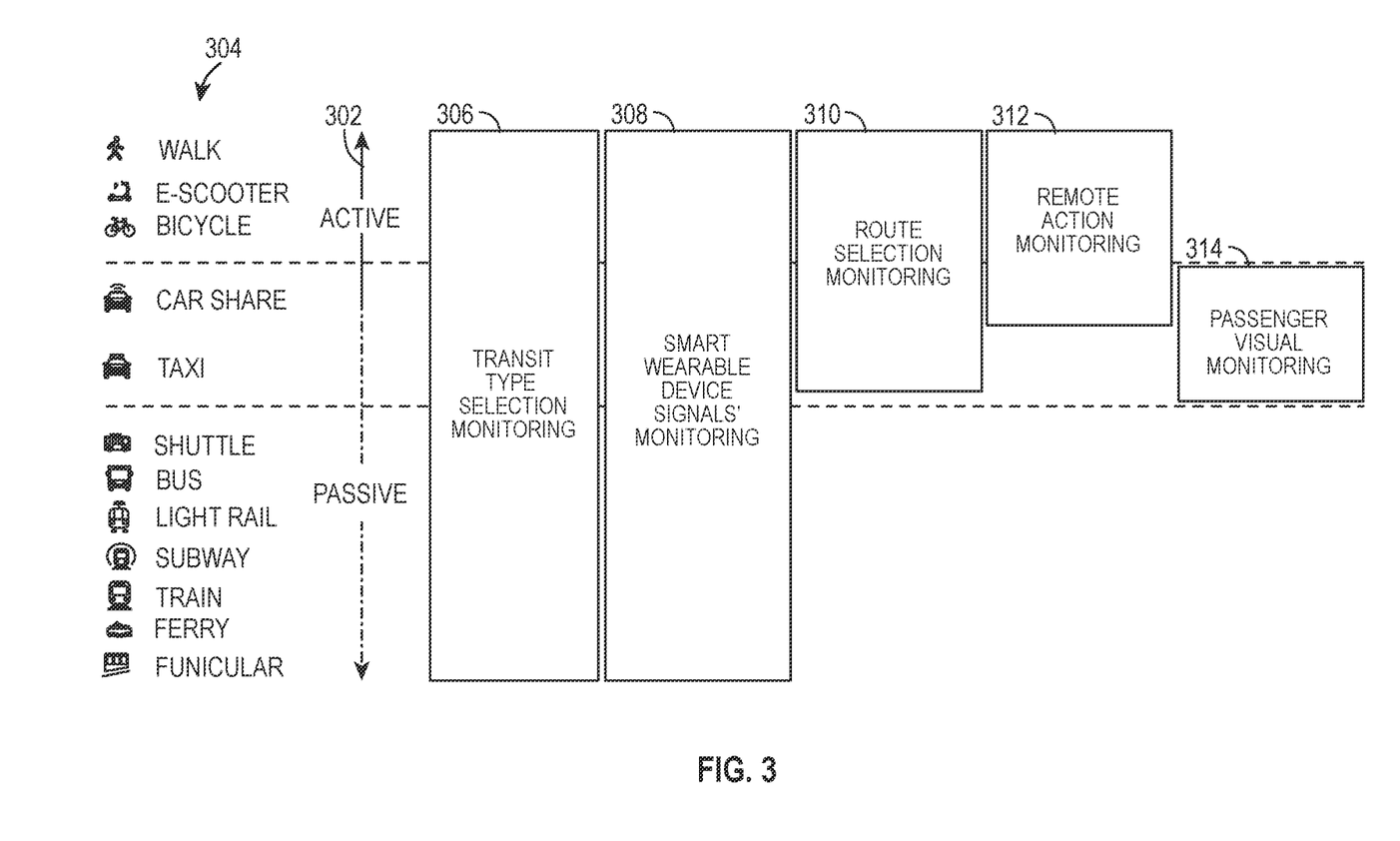
FIG. 3 illustrates a summary of different classes of risk perception estimation techniques and their respective applicability to a transportation modality in accordance with at least one example of this disclosure.

From stage 204 method 200 may proceed to stage 206 where automated techniques may be used to ascertain the user's perception of risk. FIG. 3 shows a summary of different classes of techniques and their respective applicability to a modality in accordance with at least one example of this disclosure. As shown in FIG. 3 an axis 302 may represent an involvement of a user for modalities 304. For instance, modalities such as walking, e-scooters, and bicycles may have more active user involvement. For modalities such as ferries, trains, etc. the user may be passively involved.

Box 306 may represent monitoring modalities selected by a user. For example, during route selections a user may select walking and trains as a predominant modality. Thus, the perceived risk associated with walking and trains may be low. If the user rarely selects taxis as a modality, it may imply the user perceives taxis as risky given that a taxi may be a modality for an optimal route.

Figure 4:
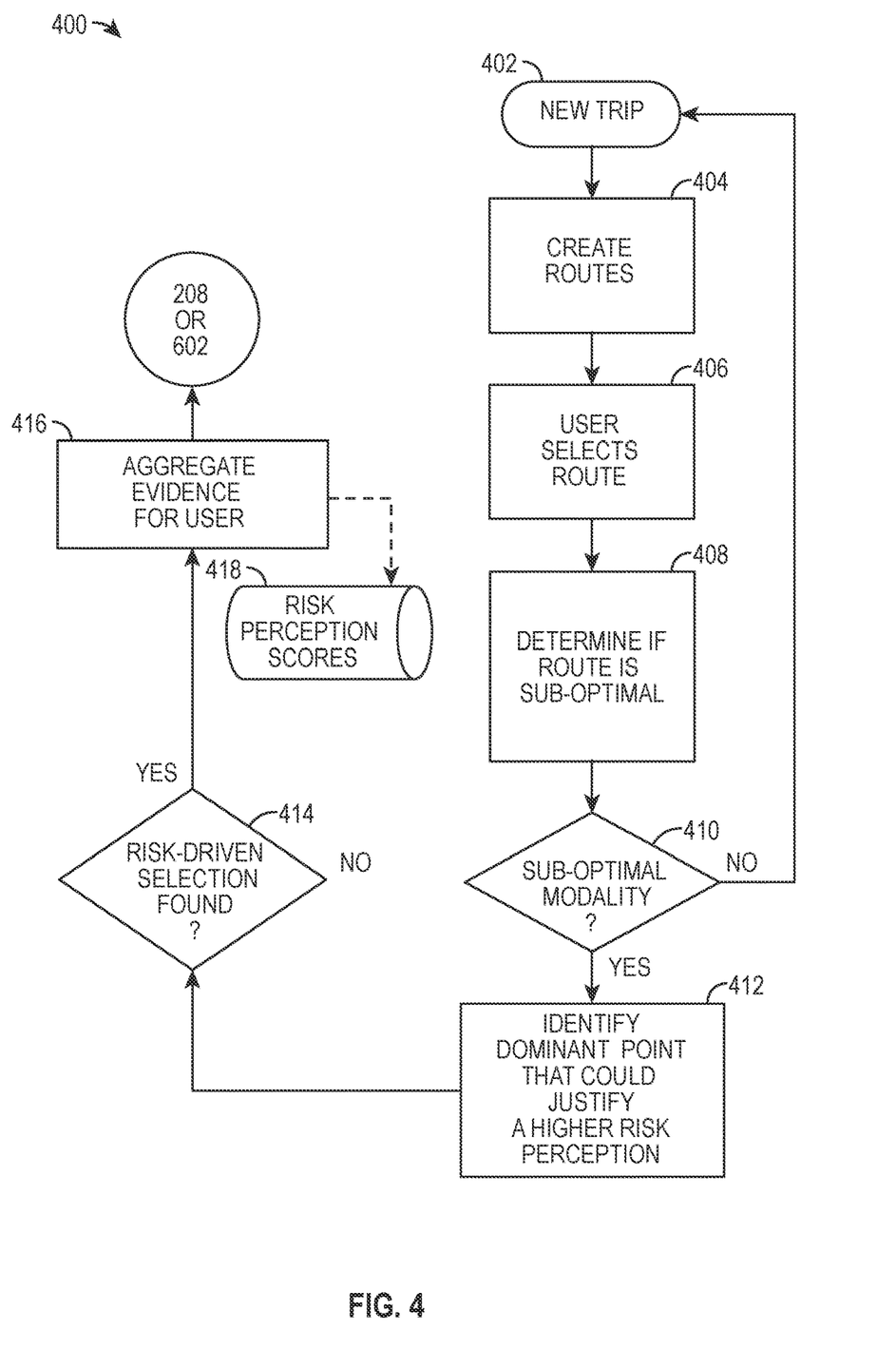
FIG. 4 illustrates a method for modality selection monitoring in accordance with at least one example of this disclosure.

FIG. 4 shows a method 400 for modality selection monitoring in accordance with at least one example of this disclosure. Method 400 may be a sub-routine for automatic monitoring stage 206 and may begin at stage 402 when a user plans a new trip for a multimodal mobility service using an application, such as a mobile or desktop app. The user can create a new trip by entering a starting location and an ending location. The starting location may be entered automatically by the user's mobile device as the user's current location. A user may also enter a starting location should it be different than the user's current location.

Once the starting and ending locations are entered, a plurality of routes may be created (404). The plurality of routes may include one or more optimal routes. The creation and identification of optimal route choices may be done using routing techniques that minimize one or more dimensions. For example, optimal routes may be routes that are minimize time, length of trip, changes in modality, and/or costs. In this example, there may be four optimal routes.

The plurality of routes may also include one or more sub-optimal routes. For example, a sub-optimal route may a route that does not minimize two or more dimensions such as time, length of trip, changes in modality, and/or cost. An optimal time route may take 20 minutes to complete and have zero changes in modality. A sub-optimal trip may take 40 minutes and have three changes in modality. Detection of sub-optimal routes is discussed further below.

Once the plurality of routes have been created, the user may select a route at stage 406. After a route is selected method 400 may proceed to stage 408 where a determination may be made as to whether or not the selected route is sub-optimal. The identification of sub-optimal route choices may be done by comparing the chosen route with the optimal routes and extracting the differences.

The route differences in a set of optimal solutions may be analyzed to identify specific segment classes that are not present in the chosen route. For example, the optimal route choices may all include a roundabout, whereas the chosen route does not. Thus, the user may perceive a risk associated with roundabouts. Another example may be that the optimal routes all include a taxi and the selected route may not. Therefore, the user may perceive a risk associated with taxis.

The specific segment classes to be looked for may correspond to the segment classes defined in the risk dimensions in stage 204. The detection of such segment classes may then be stored as evidence by incorporating the information such as, for example, a trip pseudonym, modality, segment class avoided, and evidence strength. The evidence strength may correspond to the number of instances that a difference was detected. For example, if five optimal routes included a taxi and the selected route did not, the evidence strength may be five.

Determining if the selected route is sub-optimal may also include prefiltering data. For example, routes may be prefiltered to remove routes that are pareto optimal. For example, routes that excel all other alternatives in at least one objective or dimension may be removed. Prefiltering may include testing to determine if there exist another trip alternative that achieves at least one better objective such as if an alternative would take less time, arrive on time, cost less, etc.

A formal description of determining if the selected route is sub-optimal may be expressed using Equation 1.

$$\forall i (\exists t_x \neq t^* (\exists t_x, o_i(t^* \cdot o_i < t^* \cdot o_i))) \rightarrow N) \quad \text{Equation 1}$$

where:
i stands for an index in the range [1, number of optimization objectives],
$o_i$ stands for an indexed optimization objective to be minimized,
$t^*$ stands for the selected trip alternative,
$t_x$ stands for an alternative trip, and
N stands for a predicate indicating that the selected trip alternative $t^*$ is sub-optimal.

If the chosen solution is not sub-optimal (decision block 410) method 400 may return to stage 402 as the trip selection provides no clear information to ascertain a user's perceived risks.

If the selected route is sub-optimal, method 400 may proceed to stage 412 where a dominant point that justifies a higher risk perception may be identified. Stage 412 helps to discard optimal points that are unlikely to be discarded due to a risk-driven decision. Stated another way, the user may have selected a sub-optimal route for a reason other than perceived risk.

Figure 5A:
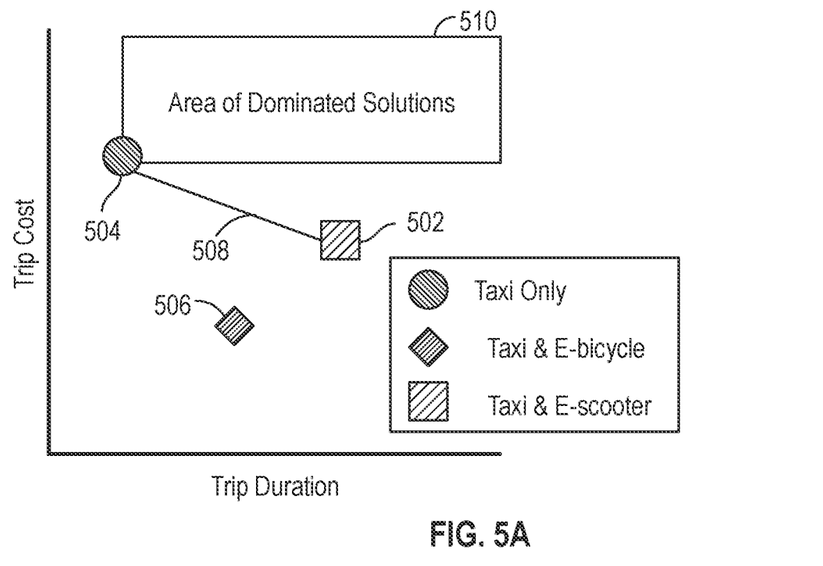
FIGS. 5A and 5B graphically illustrates areas with potentially relevant data points in accordance with at least one example of this disclosure.
Figure 5B:
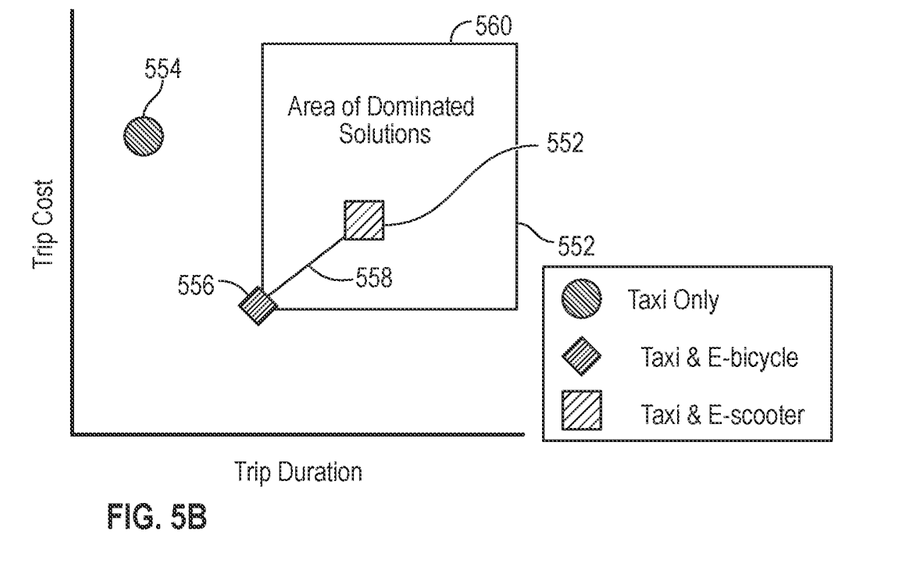

FIGS. 5A and 5B graphically show area with potentially relevant data points in accordance with at least one example of this disclosure. As shown in FIG. 5A, a user selected route 502 consists of a taxi and e-scooter modalities and was selected over a taxi only modality route 504 and a taxi and c-bicycle modalities route 506. Line 508 represents a trade-off between taxi only route 504 and the selected route 502. As shown in FIG. 5B, a user selected route 552 consists of a taxi- and e-scooter modalities and was selected over a taxi only modality route 554 and a taxi and e-bicycle modalities route 556. Line 558 represents a trade-off between taxi and e-bicycle modalities route 556 and the selected route 552. The user selected routes 502 and 552 may be selected from a plurality of route choices presented to the user.

While selected route 502 may be sub-optimal to taxi only route 504, it may have been selected for a reason other than perceived risk. For example, selected route 502 may have been selected due to cost considerations. Selected route 552 is sub-optimal to taxi and e-bicycle route 556, yet no readily apparent reason exists for its selection.

Taxi only route 504 marks the beginning of an area of dominated solutions 510 in FIG. 5A. Taxi and e-bicycle route 556 marks the beginning of an area of dominated solutions 560 in FIG. 5B. Areas of dominated solutions 510 and 560 may represent areas where routes selected include a difference that may be based on a perceived risk.

Since selected route 502 does not lie in area of dominated solutions 510, it can be discarded as not containing information that may indicate the user perceives e-scooters to increase risk compared to a taxi only. Stated another way, since selected route may have been selected to lower cost, it is not ascertainable as to whether perceived risk or cost was the deciding factor in selecting selected route 502. It could have been both perceived risk and cost.

Since selected route 552 exists inside area of dominated solutions 560 it is ascertainable that something other than cost was a dominant factor in selecting selected route 552. In this instance it can be inferred that the user perceives an e-scooter to be less risky than an e-bicycle. This is so because if the user perceived an e-scooter and an e-bicycle to have an equal risk, then the user would have selected taxi and e-bicycle route 556 since it is both faster and cheaper than the selected route 552. The result is that the selection of selected route 552 is idiomatic and provides a risk-driven selection (decision block 414).

For the comparison of the selected route 502 to the taxi only route 504 selected route 502 fails decision block 414 and method 400 proceeds to stage 208 or 602. For the comparison of the selected route 552 to the taxi and e-bicycle route 556, selected route 552 satisfies decision block 414 and method 400 proceeds to stage 416.

At stage 416 the data for selected route 552 may be aggregated as evidence of perceived risks for the user and saved in database 418 as a risk perception score. To preserve the user privacy while maintaining the ability to discern evidence originating from the same or different trips, each trip may be fed into a hash function to generate a trip pseudonym that enables the separation of evidence from repeating trips without being able to identify the trip in question. A possible data structure for the communication of dominant points may include a list of modalities for the selected trip, a list of modalities that dominate for the trip, a dictionary of trip objective differences, and hash value as the trip pseudonym. After storing the risk perception score method 400 may proceed to stage 208 or 602.

Returning to FIG. 3, Box 308 may represent signal monitoring from wearable devices. For example, during segments of a multimodal mobility service, a user's pulse or other biometric data may be monitored using a smartwatch or other wearable device. Using the user's heartrate, a level of fear, anxiety, or other emotion may be extrapolated. For instance, if the user is in a human driven taxi that is traveling fast (as measured by GPS data provided by the smartwatch) and the user has an elevated heartrate, it may be inferred that the user is frighten or otherwise nervous. Thus, the user may have a high perceived risk associated with taxis.

Use of data from wearable devices may require a user to opt-in so as to allow personal health data to be used. For example, a subset of these tracking signals may be processed in the user personal device to translate private health signals into an anonymous metric that does not disclose any personal information. The anonymous metric may only indicate a momentary detection of a possible distress, such as fear. The potential sources for this information comprise existent sensors of smart wearables such as electrodermal activity (EDA), which is a measure of the skin conductivity that can be affected by a sweat gland. This technique may be considered the most sensitive and valid markers of emotional arousal. Other viable sources for measuring a fear response may be measuring changes in body temperature.

False positives characterized as signals originating from emotions different than fear may be reduced in multiple ways. One method for reducing false positives may include combining different sensor signals that discard such different responses. A second method may include aggregating statistically significant measurements through multiple recurrences of the same trip to recognize distress correlated to trip segments.

Using the anonymized distress event signal the following information may be captured. Trip pseudonyms may be used to identify statistical correlated data of same trip repetitions. Distress event strength may be used to measure the duration and intensity of the detected event. Modality of distress events may indicate the modality of the user at the moment of the event. During a trip, an event signal may be generated only if distress is detected and not repeated for the same event.

Returning to FIG. 3, box 310 may represent route selection monitoring where the user may select the precise route, such as walking, using an e-scooter, car sharing or taxis by providing precise instructions. In such instances, the routes may be analyzed to identify avoided options that may otherwise be optimal routes.

Figure 6:
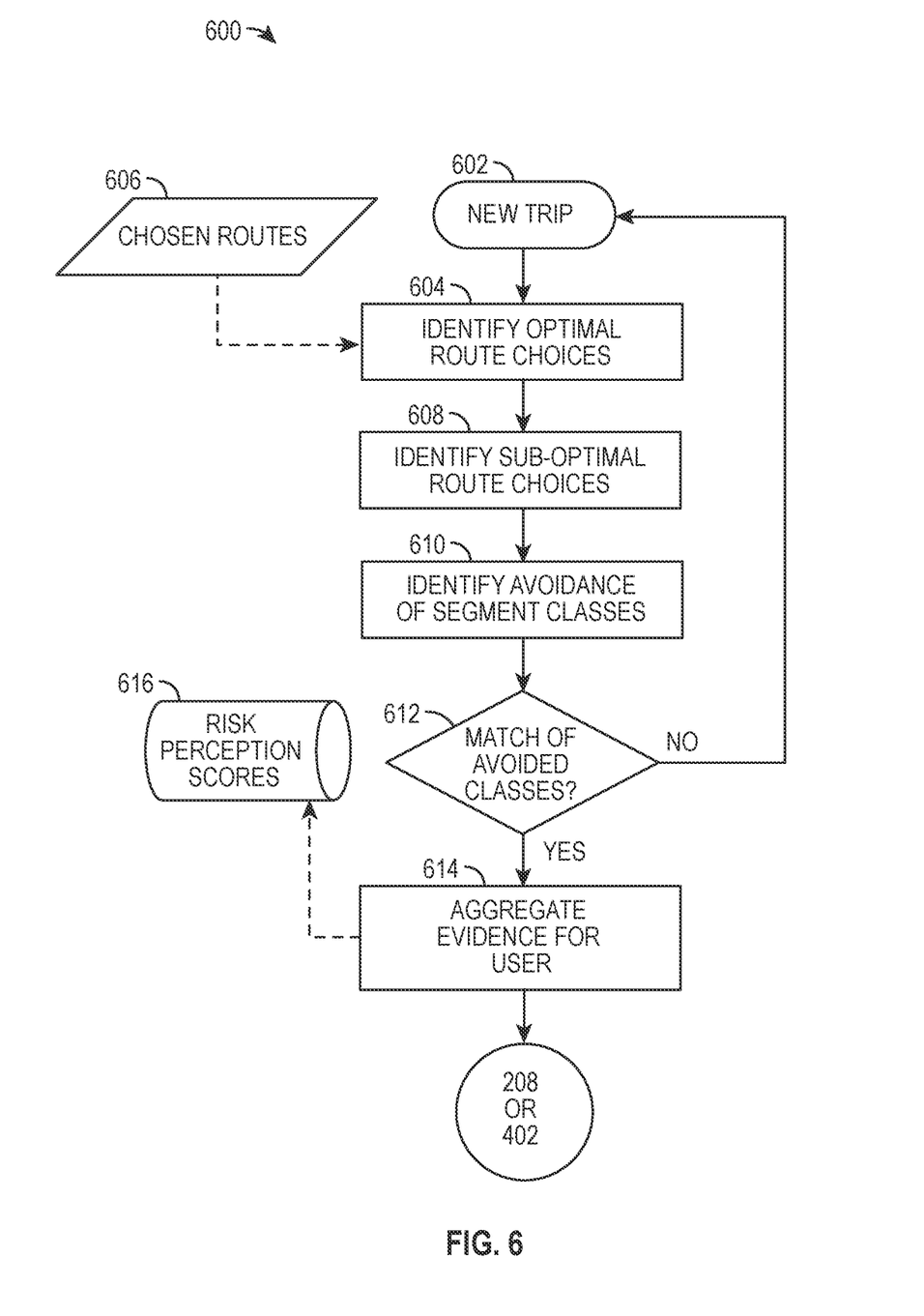
FIG. 6 illustrates a method for route selection monitoring in accordance with at least one example of this disclosure.

FIG. 6 shows a method 600 for route selection monitoring in accordance with at least one example of this disclosure. Method 600 may be a sub-routine for automatic monitoring stage 206 and may begin at stage 602 when a user plans a new trip for a multimodal mobility service using an application, such as a mobile or desktop app. The user can create and plan a new trip by entering a starting location and an ending location. The starting location may be entered automatically by the user's mobile device as the user's currently location. A user may also enter a starting location should it be different than the user's current location.

From stage 602 method 600 may proceed to stage 604 where one or more optimal route choices may be identified. Optimal routes may be created and identified using chosen routes created by the user as inputs 606. The optimal routes may also be created and/or identified as disclosed herein with respect to method 400.

After identifying optimal routes, method 600 may proceed to stage 608 where sub-optimal route choices may be identified. As disclosed herein, identification of the sub-optimal route choices may be done by comparing the chosen route with the optimal routes and extracting the differences. The specific segment classes to be looked for may correspond to the segment classes defined in the risk dimensions in stage 202.

The route differences in the set of optimal solutions may be analyzed to identify specific segment classes that are not present in the chosen route (stage 610). If no specific segment classes are present in the chosen route method 600 may fail decision block 612 and return to stage 602 for a new trip or to stage 208 or 402. If specific segment classes are not present in the chosen route decision block 612 may pass and method 600 may proceed to stage 614 where the specific segment class and route data may be aggregated as evidence for the user and stored in database 616, which may be the same database 416 from method 400. Storing the segment classes as evidence may include storing information comprising a trip pseudonym, a modality, segment class avoided, and evidence strength. The evidence strength may correspond to the number of instances that a difference was detected.

As an example, the optimal route choices may all include a roundabout and an autonomous vehicle as a modality, whereas the chosen route does not include a roundabout, but does include an autonomous vehicle as a modality. Thus, there is evidence that the user perceives roundabouts as being risky.

Returning to FIG. 3, box 312 may represent remote action monitoring. Remote action monitoring may be applied to modalities that can provide information of the actions taken through the monitoring of GPS data. This may include high-level actions, such as turn left, acceleration, safe distance kept, etc. Remote action monitoring may include counting the number of actions taken and ignoring their actual location to preserve the user privacy.

Box 314 may represent passenger visual monitoring. Passenger visual monitoring may include counting actions taken by a user as recorded by visual observation by, such as, a camera mounted inside an autonomous vehicle. For example, a user may consent to being videoed during travel in an autonomous taxi. During the segment of travel, the camera may use facial recognition and/or object tracking technologies to follow the user's eyes. By watching for dilated pupils and/or rapid eye movements, a perception of fear/risk may be inferred. Other facial expressions and/or actions may be used to detect distress that may correspond to anxiety and/or fear thereby inferring perceived risk. The actions detected by cameras may be synchronized with context of the modality's behavior. For example, a facial expression perceived as fear may be matched when the autonomous vehicle traveling through an uncontrolled intersection.

Returning to FIG. 2, after automatic monitoring and identifying safety-related attributes, method 200 may proceed to stage 208 were the various data collected may be interpreted to form risk perception scores. As disclosed herein, the user preferences for modalities, segment classes, etc. may be correlated with routes a user has utilized to create various tuples (or other data structures) that represent a user's perceived risks for modalities, segment classes, etc. and supporting instances values as weighting parameter.

At stage 210, an optimal multimodal trip may be created that minimizes a user's perceived risks for each modality used as well as segment classes used during the trip. As disclosed herein, the database of risk scores (e.g., database 416 and/or 616) for the different dimensions (i.e., modalities, segment classes, etc.) may be used as an input for the planning of multimodal trips. In other words, past travel data for the user associated with modal mobility services used during the past may be used. The risk scores for the different dimensions may be referred to as segmented risk perception scores because they may represent risk perception scores for segments of a multimodal trip. The risk perception scores may be used as another optimization objective to minimize when planning a trip. For example, instead of minimize time, the systems and methods disclosed herein may minimize the risk perception score for the multimodal trip.

To determine the estimation of the total user perceived risk of a trip, a dot-product of risk perception score vectors and selected modalities may be performed. The dot-product operation may also be performed by weighting the trip length proportion of each modality multiplied by another route-dependent factor. The route-dependent factor weights in the various dimensions captured, such as the number of left-turns, number of round-abouts taken, segment class proportion, etc. To compute this factor, each risk score of the applicable dimension for each modality may be multiplied with the number of instances found in the route and at the end aggregated.

At stage 212 a summary of risks minimized may be presented to the user. Each mobility alternative presented may include a total risk score and the most significant contributors to the perceived risk. The most significant contributors may be based on their total accumulated value to the total risk perception score. Scores for dimensions deemed important for the user may also be shown to also highlight the absence of certain perceived risks. The user may opt to manually specify his or her own perception of risk based on the provided results to fine tune the estimations. Additionally, the user may provide scores for the comfort of each modality. The proposed techniques can explicitly take it into account to discard choices dominated by that criteria.

Once the multimodal trip is optimized to have a low perceived risk, the user may confirm the trip. For example, if the trip includes the user of an autonomous vehicle, the user may confirm the trip and upon confirming the trip (or at a later time depending on when the trip is scheduled), an activation signal may be transmitted to the autonomous vehicle. The activation signal may cause the autonomous vehicle to drive to the starting location of the multimodal trip or a location along the trip to meet the user to complete the segment using the autonomous vehicle.

The various embodiments disclosed herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the -readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 7:
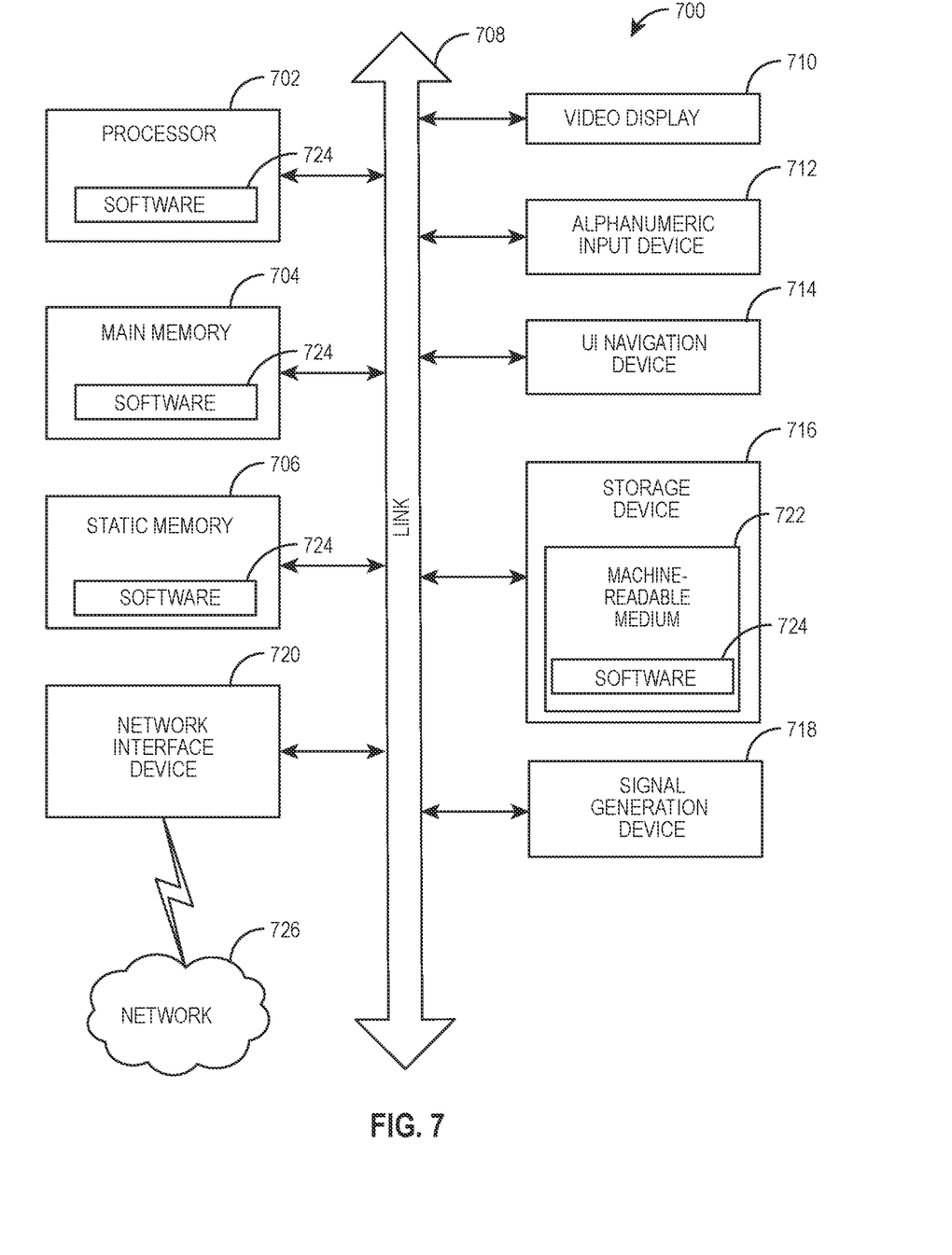
FIG. 7 illustrates a block diagram of an example machine upon which any one or more of the techniques (e.g., methodologies) discussed herein may perform in accordance with at least one example of this disclosure.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 7 is a block diagram illustrating a machine in the example form of a computer system 700, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a vehicle subsystem, a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus). The computer system 700 may further include a video display unit 710, an alphanumeric input device 712 (e.g., a keyboard), and a user interface (UI) navigation device 714 (e.g., a mouse). In one embodiment, the video display unit 710, input device 712 and UI navigation device 714 are incorporated into a touch screen display. The computer system 700 may additionally include a storage device 716 (e.g., a drive unit), a signal generation device 718 (e.g., a speaker), a network interface device 720, and one or more sensors (not shown), such as a global positioning system (GPS) sensor, compass, accelerometer, gyrometer, magnetometer, or other sensor.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or satellite communication networks). The term "transmission medium" shall be taken to include any intangible medium that is capable of storing, encoding, or carrying instructions for execution by the machine, and includes digital or analog communications signals or other intangible medium to facilitate communication of such software.

Additional Notes

The following, non-limiting examples, detail certain aspects of the present subject matter to solve the challenges and provide the benefits discussed herein, among others.

Example 1 is a method for minimizing a perceived risk for a multimodal mobility service, the method comprising: identifying, by a computing device, a safety-related attribute for a route from a starting location to an ending location, the safety-related attribute associated with the perceived risk for a dimension of the route; determining, by the computing device, a risk score for the route using the safety-related attribute; and providing, by the computing device, the risk score of the multimodal mobility service.

In Example 2, the subject matter of Example 1 optionally includes wherein the safety-related attribute is based on avoidance of particular modality of a mobility service.

In Example 3, the subject matter of any one or more of Examples 1-2 optionally include storing, in a memory, the risk score as a triple including a belief value that ranges from [0,1] and a supporting instance value equal to a number of supporting instances.

In Example 4, the subject matter of any one or more of Examples 1-3 optionally include receiving past travel data, the past travel data including information associated with modal mobility services used during past travel; determining a risk score for modal mobility services used during the past travel.

In Example 5, the subject matter of any one or more of Examples 1-4 optionally include wherein providing the risk score includes providing a subset of a plurality of routes having a minimum risk score.

In Example 6, the subject matter of any one or more of Examples 1-5 optionally include receiving user preferences identifying modalities perceived as risky by a user.

In Example 7, the subject matter of any one or more of Examples 1-6 optionally include creating a plurality of optimal routes, the plurality of optimal routes being optimal in multiple dimensions and provide no known trade-off to the route including the attribute; and identifying the attribute based on an absence of the attribute from the plurality of optimal routes.

In Example 8, the subject matter of any one or more of Examples 1-7 optionally include receiving an input from a user to select the route.

Example 9 is at least one computer-readable medium comprising instructions to perform any of the methods of Examples 1-8.

Example 10 is an apparatus comprising means for performing any of the methods of Examples 1-8.

Example 11 is a method for modality selection monitoring, the method comprising: determining, by a computing device, that a route from a starting location to an ending location is a sub-optimal route due to an inclusion of a sub-optimal modality; identifying, by the computing device, a dominant point that justifies a high-risk perception for an optimal modality not found in the route; and determining, by the computing device, a risk score for the optimal modality and the sub-optimal modality.

In Example 12, the subject matter of Example 11 optionally includes creating a plurality of routes, the route being one of the plurality of routes; and receiving an input from a user to select the route.

In Example 13, the subject matter of any one or more of Examples 11-12 optionally include creating a plurality of routes, a selected route being one of the plurality of routes; identifying a plurality of sub-optimal routes from the plurality of routes; and determining an area of dominant solutions based on the selected route and the plurality of sub-optimal routes.

In Example 14, the subject matter of Example 13 optionally includes excluding a subset of the plurality of routes that lie outside the area of dominant solutions.

In Example 15, the subject matter of any one or more of Examples 13-14 optionally include determining the route is a sub-optimal route by determining that the route lies in the area of dominant solutions.

In Example 16, the subject matter of any one or more of Examples 11-15 optionally include prefiltering a plurality of routes to remove pareto optimal solutions.

In Example 17, the subject matter of any one or more of Examples 11-16 optionally include storing, in a memory, the risk score as a tuple including a belief value that ranges from [0,1] and a supporting instance value equal to a number of supporting instances.

In Example 18, the subject matter of any one or more of Examples 11-17 optionally include creating the route from the starting location to the ending location.

Example 19 is at least one computer-readable medium comprising instructions to perform any of the methods of Examples 1-18.

Example 20 is an apparatus comprising means for performing any of the methods of Examples 1-18.

Example 21 is a method for route selection monitoring, the method comprising: identifying, by a computing device, an optimal route from a starting location to an ending location; identifying, by the computing device, a sub-optimal route from the starting location to the ending location; identifying, by the computing device, an avoided segment class in the optimal route and not in the sub-optimal route; and determining, by the computing device, a risk score for the avoided segment class.

In Example 22, the subject matter of Example 21 optionally includes receiving user preferences.

In Example 23, the subject matter of Example 22 optionally includes wherein the avoided segment class is specified in the user preferences.

In Example 24, the subject matter of any one or more of Examples 21-23 optionally include creating a plurality of routes; identifying a plurality of sub-optimal routes from the plurality of routes; and determining an area of dominant solutions based on the plurality of sub-optimal routes.

In Example 25, the subject matter of Example 24 optionally includes excluding a subset of the plurality of routes that lie outside the area of dominant solutions.

In Example 26, the subject matter of any one or more of Examples 24-25 optionally include determining a route is a sub-optimal route by determining that the route lies in the area of dominant solutions.

In Example 27, the subject matter of any one or more of Examples 21-26 optionally include prefiltering a plurality of routes to remove pareto optimal solutions.

In Example 28, the subject matter of any one or more of Examples 21-27 optionally include storing, in a memory, the risk score as a tuple including a belief value that ranges from [0,1] and a supporting instance value equal to a number of supporting instances.

Example 29 is at least one computer-readable medium comprising instructions to perform any of the methods of Examples 1-18.

Example 30 is an apparatus comprising means for performing any of the methods of Examples 1-18.

Example 31 is a system for minimizing a perceived risk for a multimodal mobility service, the system comprising: a processor; and a memory storing instructions that, when executed by the processor, causes the processor to perform actions comprising: identifying a safety-related attribute for a route from a starting location to an ending location, the safety-related attribute associated with the perceived risk for a dimension of the route; determining a risk score for the route using the safety-related attribute; and providing the risk score of the multimodal mobility service.

In Example 32, the subject matter of Example 31 optionally includes wherein the safety-related attribute is based on avoidance of particular modality of a mobility service.

In Example 33, the subject matter of any one or more of Examples 31-32 optionally include wherein the actions further comprise storing the risk score as a tuple including a belief value that ranges from [0,1] and a supporting instance value equal to a number of supporting instances.

In Example 34, the subject matter of any one or more of Examples 31-33 optionally include wherein the actions further comprise: receiving past travel data, the past travel data including information associated with modal mobility services used during past travel; determining a risk core for the modal mobility services used during the past travel.

In Example 35, the subject matter of any one or more of Examples 31-34 optionally include wherein providing the risk score includes additional instructions that cause the processor to perform additional actions comprising providing a subset of a plurality of routes having a minimum risk score.

In Example 36, the subject matter of any one or more of Examples 31-35 optionally include wherein the actions further comprise receiving user preferences identifying modalities perceived as risky by a user.

In Example 37, the subject matter of any one or more of Examples 31-36 optionally include wherein the actions further comprise: creating a plurality of optimal routes, the plurality of optimal routes being optimal in multiple dimensions and provide no known trade-off to the route including the attribute; and identifying the attribute based on an absence of the attribute from the plurality of optimal routes.

In Example 38, the subject matter of any one or more of Examples 31-37 optionally include wherein the actions further comprise receiving an input from a user to select the route.

Example 39 is a system for modality selection monitoring, the method comprising: a processor; and a memory storing instructions that, when executed by the processor, causes the processor to perform actions comprising: determining that a route from a starting location to an ending location is a sub-optimal route due to an inclusion of a sub-optimal modality; identifying a dominant point that justifies a high-risk perception for an optimal modality not found in the route; and determining a risk score for the optimal modality and the sub-optimal modality.

In Example 40, the subject matter of Example 39 optionally includes wherein the actions further comprise: creating a plurality of routes, the route being one of the plurality of routes; and receiving an input from a user to select the route.

In Example 41, the subject matter of any one or more of Examples 39-40 optionally include wherein the actions further comprise: creating a plurality of routes, a selected route being one of the plurality of routes; identifying a plurality of sub-optimal routes from the plurality of routes; and determining an area of dominant solutions based on the selected route and the plurality of sub-optimal routes.

In Example 42, the subject matter of Example 41 optionally includes wherein the actions further comprise excluding a subset of the plurality of routes that lie outside the area of dominant solutions.

In Example 43, the subject matter of any one or more of Examples 41-42 optionally include wherein the actions further comprise determining the route is a sub-optimal route by determining that the route lies in the area of dominant solutions.

In Example 44, the subject matter of any one or more of Examples 39-43 optionally include wherein the actions further comprise prefiltering a plurality of routes to remove pareto optimal solutions.

In Example 45, the subject matter of any one or more of Examples 39-44 optionally include wherein the actions further comprise storing the risk score as a tuple including a belief value that ranges from [0,1] and a supporting instance value equal to a number of supporting instances.

In Example 46, the subject matter of any one or more of Examples 39-45 optionally include wherein the actions further comprise creating the route from the starting location to the ending location.

Example 47 is a system for route selection monitoring, the method comprising: a processor; and a memory storing instructions that, when executed by the processor, causes the processor to perform actions comprising: identifying an optimal route from a starting location to an ending location; identifying a sub-optimal route from the starting location to the ending location; identifying an avoided segment class in the optimal route and not in the sub-optimal route; and determining a risk score for the avoided segment class.

In Example 48, the subject matter of Example 47 optionally includes wherein the actions further comprise receiving user preferences.

In Example 49, the subject matter of Example 48 optionally includes wherein the avoided segment class is specified in the user preferences.

In Example 50, the subject matter of any one or more of Examples 47-49 optionally include wherein the actions further comprise: creating a plurality of routes; identifying a plurality of sub-optimal routes from the plurality of routes; and determining an area of dominant solutions based on the plurality of sub-optimal routes.

In Example 51, the subject matter of Example 50 optionally includes wherein the actions further comprise excluding a subset of the plurality of routes that lie outside the area of dominant solutions.

In Example 52, the subject matter of any one or more of Examples 50-51 optionally include wherein the actions further comprise determining a route is a sub-optimal route by determining that the route lies in the area of dominant solutions.

In Example 53, the subject matter of any one or more of Examples 47-52 optionally include wherein the actions further comprise prefiltering a plurality of routes to remove pareto optimal solutions.

In Example 54, the subject matter of any one or more of Examples 47-53 optionally include wherein the actions further comprise storing in a memory, the risk score as a tuple including a belief value that ranges from [0,1] and a supporting instance value equal to a number of supporting instances.

In Example 55, the apparatuses or methods of any one or any combination of Examples 1-54 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more," In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system for minimizing a perceived risk for a multimodal mobility service, the system comprising:
   a processor; and
   a memory storing instructions that, when executed by the processor, causes the processor to perform actions comprising:
      determining a safety-related attribute for a plurality of routes from a start location to an end location, the safety-related attribute associated with the perceived risk for dimensions of the plurality of routes, the plurality of routes including routes that have different travel modalities;
      determining a risk score for each of the plurality of routes using the safety-related attribute, the risk score being comprised of risk sub-scores for each of a plurality of dimensions in the plurality of routes;
      providing the risk score of the plurality of routes and risk sub-scores of at least a portion of the plurality of dimensions in the plurality of routes;
      receiving an input from a user to select a route from the plurality of routes to provide a selected route;
      presenting the selected route to the user in a navigation user interface of the multimodal mobility service;
      initiating an autonomous vehicle operation to traverse at least a portion of the selected route when the selected route includes travel with an autonomous vehicle;
      comparing the selected route to unselected routes in the plurality of routes to identify dimensions of the unselected routes in the plurality of routes that do not exist in the selected route, wherein the dimensions comprise specific route characteristics including one or more of transportation modalities available on a route, segment classes of road segments on the route, maneuvers used during traversal of the route, and driving parameters of the route, which are actively avoided in the selected route;
      using the dimensions of the unselected routes in the plurality of routes to determine a second plurality of routes from a second start position to a second end location that includes dimensions of the unselected routes that do not exist in the selected route during a later route selection by the user; and
      presenting the second plurality of routes to the user along with risk scores of the second plurality of routes.

2. The system of claim 1, wherein the safety-related attribute is based on avoidance of particular modality of a mobility service.

3. The system of claim 1, wherein the actions further comprise storing the risk score as a tuple including a belief value that ranges from 0 to 1 and a supporting instance value equal to a number of supporting instances.

4. The system of claim 1, wherein the actions further comprise:
   receiving past travel data, the past travel data including information associated with modal mobility services used for past travel; and
   determining a risk score for the modal mobility services used for the past travel.

5. The system of claim 1, wherein providing the risk score includes additional instructions that cause the processor to perform additional actions comprising providing a subset of a plurality of routes having a minimum risk score.

6. The system of claim 1, wherein the actions further comprise receiving user preferences identifying modalities perceived as risky by a user.

7. The system of claim 1, wherein the actions further comprise:
   creating a plurality of optimal routes, the plurality of optimal routes being optimal in all known dimensions and provide no known trade-off to the route including the safety-related attribute; and
   determining the safety-related attribute based on an absence of the safety-related attribute from the plurality of optimal routes.

8. A system for modality selection monitoring, the system comprising:
   a processor; and
   a memory storing instructions that, when executed by the processor, causes the processor to perform actions comprising:
      determining that a route from a start location to an end location is a sub-optimal route due to an inclusion of a sub-optimal transportation modality;
      determining a dominant point that justifies a high-risk perception for an optimal transportation modality not found in the sub-optimal route;
      determining a risk score for the optimal transportation modality and the sub-optimal transportation modality, the risk score being comprised of risk sub-scores for each of a plurality of dimensions in the optimal transportation modality and the sub-optimal transportation modality, wherein the plurality of dimensions comprise specific route characteristics including one or more of transportation modalities available on a route, segment classes of road segments on the route, maneuvers used during traversal of the route, and driving parameters of the route, which are actively avoided in the sub-optimal route;
      receiving an input from a user to select the sub-optimal route to provide a selected sub-optimal route;
      presenting the selected sub-optimal route to guide the user in a navigation user interface;
      initiating an autonomous vehicle operation to traverse at least a portion of the selected sub-optimal route when the selected sub-optimal route includes travel with an autonomous vehicle;
      using the risk score for the optimal transportation modality and the sub-optimal transportation modality to identify dimensions of the sub-optimal transportation modality that do not exist in the optimal transportation modality and determine a second plurality of routes from a second start position to a second end location during a later route selection by the user that includes dimensions identified in the sub-optimal transportation modality that are not in the optimal transportation modality; and
      presenting the second plurality of routes to the user along with risk scores of the second plurality of routes in the navigation user interface.

9. The system of claim 8, wherein the actions further comprise:
   creating a plurality of routes, the sub-optimal route being one of the plurality of routes.

10. The system of claim 8, wherein the actions further comprise:
creating a plurality of routes, a selected sub-optimal route being one of the plurality of routes;
determining a plurality of sub-optimal routes from the plurality of routes; and
determining an area of dominant solutions based on the selected sub-optimal route and the plurality of sub-optimal routes.

11. The system of claim 10, wherein the actions further comprise discarding a subset of the plurality of routes that lie outside the area of dominant solutions.

12. The system of claim 10, wherein the actions further comprise determining the route is a sub-optimal route by determining that the route lies in the area of dominant solutions.

13. The system of claim 8, wherein the actions further comprise prefiltering a plurality of routes to remove pareto optimal solutions.

14. The system of claim 8, wherein the actions further comprise storing the risk score as a tuple including a belief value that ranges from 0 to 1 and a supporting instance value equal to a number of supporting instances.

15. The system of claim 8 wherein the actions further comprise creating the sub-optimal route from the start location to the end location.

16. A system for route selection monitoring, the system comprising:
a processor; and
a memory storing instructions that, when executed by the processor, causes the processor to perform actions comprising:
determining an optimal route from a start location to an end location;
determining a sub-optimal route from the start location to the end location;
determining a risk score for the sub-optimal route, the risk score being comprised of risk sub-scores for each of a plurality of dimensions in the sub-optimal route;
determining an avoided roadway segment class in the optimal route and not in the sub-optimal route, wherein the avoided roadway segment class represents a specific dimension that is actively avoided through selection of the sub-optimal route, the specific dimension comprising a specific route characteristic including one or more of transportation modalities available on a route, segment classes of road segments on the route, maneuvers used during traversal of the route, and driving parameters of the route, which are actively avoided in the sub-optimal route;
determining a risk sub-score for the avoided roadway segment class that contributed to the risk score for the sub-optimal route;
receiving an input from a user to select the optimal route or the sub-optimal route to provide a selected route;
presenting the selected route to the user in a navigation user interface;
initiating an autonomous vehicle operation to traverse at least a portion of the selected route when the selected route includes travel with an autonomous vehicle;
using the risk sub-score for the avoided roadway segment class to determine a second plurality of routes from a second start position to a second end location that exclude dimensions identified in the risk sub-score for the avoided roadway segment class during a later route selection by the user; and
presenting the second plurality of routes to the user along with risk scores of the second plurality of routes.

17. The system of claim 16, wherein the actions further comprise receiving user preferences specifying the avoided roadway segment class.

18. The system of claim 17, wherein the avoided roadway segment class includes at least one of a roundabout, a left turn, a two-way street, and a tunnel.

19. The system of claim 16, wherein the actions further comprise:
creating a plurality of routes;
determining a plurality of sub-optimal routes from the plurality of routes; and
determining an area of dominant solutions based on the plurality of sub-optimal routes.

20. The system of claim 19, wherein the actions further comprise discarding a subset of the plurality of routes that lie outside the area of dominant solutions.

21. The system of claim 19, wherein the actions further comprise determining a route is a sub-optimal route by determining that the route lies in the area of dominant solutions.

22. The system of claim 16, wherein the actions further comprise prefiltering a plurality of routes to remove pareto optimal solutions.

23. The system of claim 16, wherein the actions further comprise storing in a memory, the risk score as a tuple including a belief value that ranges from 0 to 1 and a supporting instance value equal to a number of supporting instances.

* * * * *